Nov. 16, 1926.
F. T. O'GRADY
COLOR MOTION PICTURE PHOTOGRAPHY
Filed Dec. 4, 1922
1,607,593
2 Sheets-Sheet 1
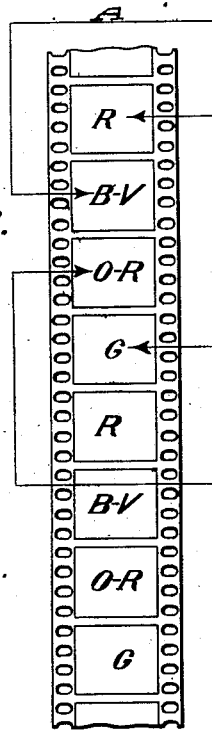
Fig. 1.
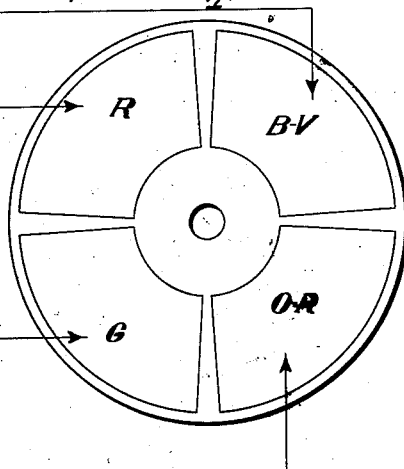
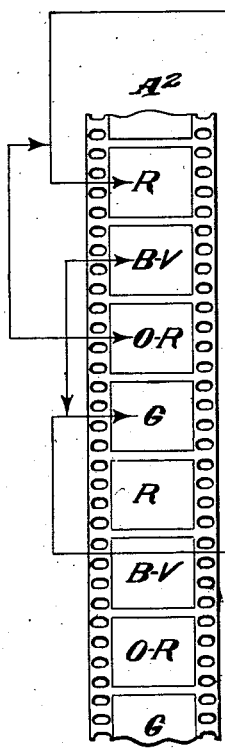
Fig. 2.
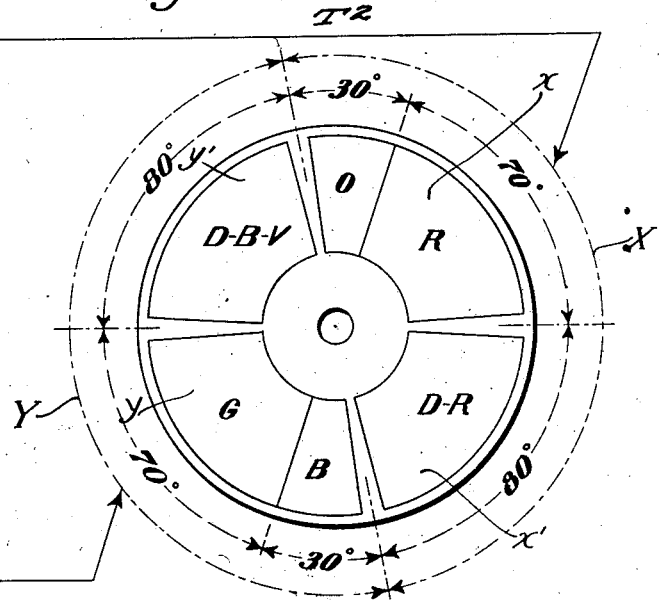
INVENTOR
Frederick Thomas O'Grady
BY
ATTORNEYS Nov. 16, 1926.  
F. T. O'GRADY  
1,607,593  
COLOR MOTION PICTURE PHOTOGRAPHY  
Filed Dec. 4, 1922  
2 Sheets-Sheet 2

INVENTOR  
Frederick Thomas O'Grady  
BY  
ATTORNEYS

Patented Nov. 16, 1926.

1,607,593

UNITED STATES PATENT OFFICE.

FREDERICK THOMAS O'GRADY, OF FLUSHING, NEW YORK, ASSIGNOR TO HELEN VOGT O'GRADY, OF FLUSHING, LONG ISLAND, NEW YORK.

COLOR-MOTION-PICTURE PHOTOGRAPHY.

Application filed December 4, 1922. Serial No. 604,795.

The main objects of this invention are to produce motion pictures in substantially the natural colors of the original objects or scenes photographed; to greatly eliminate color pulsation and flicker; to obtain increased illumination in projection, and to greatly reduce the speed of projection. These objects are attained by a new method of taking the pictures through a series of color filter screens and then projecting them through a novel form of color filter shutter or screen. The color filter screen for the picture projecting apparatus is provided with exposure sections and shutter sections. The exposure sections permit the light rays to pass for the purpose of illuminating a single picture while the shutter sections cover the aperture of the projecting apparatus during the period of change of pictures. The exposure sections of my improved picture screen are made up of a plurality of color filters so that each picture is illuminated through a plurality of color filters. The shutter sections are formed of semi-transparent material. I prefer to make these shutter sections of color filters somewhat more dense than the color filters of the exposure sections, the purpose being to maintain a reduced illumination of the projection viewing screen during the period of change of pictures and to maintain the color effect during that part of reduced illumination.

In carrying out previously known methods of producing motion pictures in colors, two or more of the primary colors are employed in such manner that successive pictures on the film represent the respective color components of the objects or scenes photographed. By the rapid projection of these pictures through color screens corresponding to the respective color records, the effect of superposition and blending of color is obtained, giving the observer the illusion of pictures in approximately natural colors.

In working these old methods it is the practice to photograph (and also to project) two or more pictures in rapid succession through color screens, each of these pictures passing only one of the primary colors. Owing to the widely different color values, and violent light changes, it is necessary to project the two or more single color images at such a speed as to prevent, as near as possible, the observance of one change of color to another. In spite of this increased speed of projection, the change from one color picture to another is still greatly discernible; causing what is known as color pulsation. Also, the interval between the change from one color period to the other is so great that it is noticed in the form of a flicker. The color pulsation and flicker cause considerable optical discomfort to the observer.

With my invention a marked advance in reproducing the natural shades and tones of color is obtained with the aid of rotating color screens or filters composed of colors of the spectrum, and in such a way as to practically eliminate such disadvantages as the dominant or most clearly distinct color pulsation and flicker.

In describing my invention, I will refer to the accompanying drawings in which:

Fig. 1 is a diagrammatic view showing a section of a negative film with its relation to the taking screen;

Fig. 2 is a diagrammatic view showing a section of a positive film with its relation to the projection screen.

Figure 3:
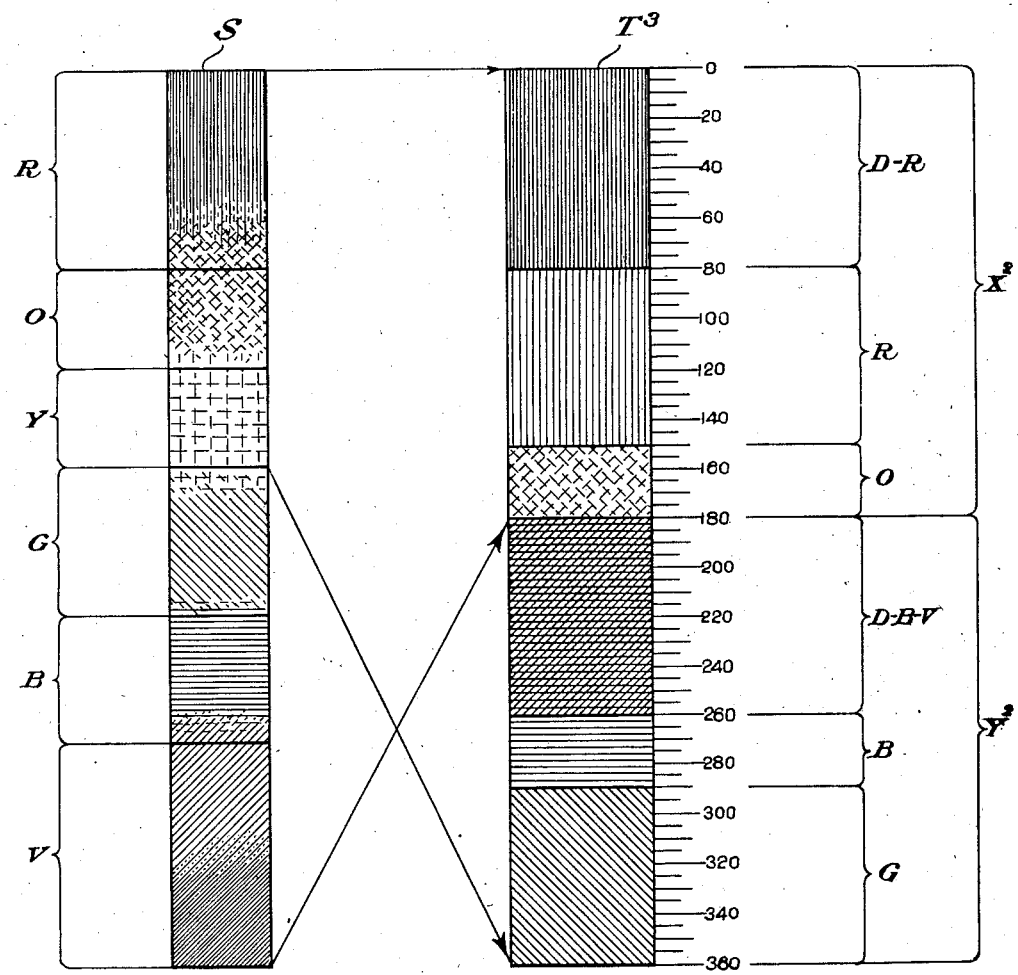
Fig. 3 is a diagrammatic view of the projection filters arranged in longitudinal order, and showing their relation to the spectrum.

Referring to Fig. 1 "A" designates a section of a negative film sufficient in length to illustrate the four alternate color exposure sections as made in the taking camera through the taking screen T. In both A and T red, blue-violet, orange-red and green are designated by the letters R, B—V, O—R and G respectively.

Referring to Fig. 2, "A²" designates a section of a positive film sufficient in length to illustrate the four color exposures as projected through the projection screen T². In "A²", red, blue-violet, orange-red and green, are designated by the letters R, B—V, O—R and G respectively, and in T², orange, red, dark red, blue, green and dark blue-violet are designated by the letters O, R, D—R, B, G and D—B—V respectively. The projection screen T² is composed of exposure sections $x$ and $y$ at diametrically opposite positions, and shutter sections $x'$ and $y'$ at diametrically opposite positions, the shutter sections being interposed between the exposure sections. The exposure section $x$ is composed of color filters O and R, while the exposure section $y$ is composed of color filters G and B. The shutter section $x'$ is composed of the color filter D—R and the shutter section $y'$ is composed of the color filter D—B—V.

In carrying out my invention, I first make a negative record of four color sensations, alternating with each other, with a camera of the ordinary type used for taking motion pictures, except that I employ a rotating color screen, (T Fig. 1) of red, blue-violet, orange-red and green transparent filters. This color screen is geared in any approved manner to travel in synchronism with the film, so as to alternately bring the color filters into position for every successive exposure of the negative film in the camera. A negative record, (A Fig. 1) is thus obtained in which there are groups of four different color records. The negative film on which these negative records are photographed will, of course, be coated with an emulsion which has been rendered sensitive to the action of all colors. Such an emulsion is known as "panchromatic emulsion."

A positive print is then made, on a standard positive film from this negative film, and this positive film is then used in any motion picture projecting machine of the standard type, except that said machine is to be provided with a rotating transparent color screen having a plurality of color filter screens, ($T^2$—Fig. 2). This color screen is used in place of the usual sectional, opaque, revolving shutter of the standard projection machines, and is adapted to conceal the change from one picture area to the other, and may be placed either in front, or in the rear, of the film. The rotating color screen is composed of six different transparent color filter screens occupying the entire circumference and representing in circumferential order the main or dominant colors of the spectrum band, and arranged in two sections, (X and Y in $T^2$ Fig. 2). These two sections are each divided into three color segments, the first section, X, being composed of orange-red, red, and dark-red, and the second section Y being composed of blue, green and dark blue-violet. In composing the colors of this projection screen, I have adhered, as closely as possible, to the six main or dominant colors of the spectrum and have divided them into two sections, one section being complementary to colors of the other section, one of said sections ranging in bands of spectral colors from blue-violet to green, and the other section from orange-red to deep-red, both sections occupying the entire circumference of the screen and making an unbroken band of the most clearly distinct colors of the spectrum.

The two sections (X and Y) are timed to travel in synchronism with the positive film so as to alternately bring them into position for every successive picture area of the positive film. The dark-red and the dark blue-violet shutter segments are timed with the projector mechanism and are of sufficient density and circumferential length to effectively conceal the change from one picture area to the next, but still of sufficient transparency to permit a certain percentage of light to pass through to the projection viewing screen. The other color filter segments are of a much lighter shade of color and are timed to pass before the projection light in alternate sectional order during the stationary period of each picture area.

From the foregoing it will be seen that as each group of four color selected picture areas is projected, the color screen or filter, makes two complete revolutions. In this manner, when the red and orange-red picture areas are moved into position in the projector aperture they are each covered by section "X" of the color filter, and when the blue-violet and green picture areas are moved into position in the projector aperture, they are each covered by section "Y" of the color filter. The red picture area will be illuminated by light rays passing through the color filters O and R of the exposure section $x$. The illumination of the projection viewing screen will then be reduced by the color filter shutter section D—R. During this reduced illumination the B—V picture area will be moved into the projector aperture. This picture area will then be illuminated by light rays passing through the color filters B and G of the exposure section $y$. The illumination of the B—V picture area will then be reduced by the color filter shutter section $y'$, D—B—V. During this part of the reduced illumination the picture area O—R will be moved into the aperture of the projector. This orange-red picture area will then be illuminated by light rays passing through the exposure section $x$, O and R. This picture will then in turn be reduced in illumination by the shutter section $x'$, D—R, and during this reduced illumination the G picture area will be moved into the projector aperture. The G picture area will then be illuminated by the light rays passing through the color filters B and G of the exposure section $y$. The illumination of the G picture area will be reduced by the shutter section $y'$, D—B—V and then the picture area R of the next group of pictures will be brought into the exposure aperture of the projector.

Thus it will be readily seen, that although the positive film is comprised of groups of four color selected images or areas, the images are projected through six different densities or shades of color filters, which are so arranged that during the projection of each single picture area, three different shades of color are passed in the path of the projection light. Also, it will readily be seen, that owing to the varying shades of the four color records or picture areas of the positive film, a greater range of color shades and tones is obtained, inasmuch as the densities of exposure in the red picture area differ to a certain degree from the densities of exposure of the orange-red picture area. Likewise, the densities of exposure in the blue-violet picture area differ to a certain degree from the densities of exposure in the green picture area. It is further apparent that, owing to these varying shades of the four colors in the positive film records, combined with the six different shades of color filters, being rapidly overlapped in the eye of the observer by what is known as persistency of vision, and owing to the fact that at no time during projection is the projection light completely cut off from the viewing screen, motion pictures in natural colors will be obtained with a minimum amount of color pulsation and flicker.

Where in this disclosure I have referred to the projection screen being composed of six segments of different shades of color, I wish it to be clearly understood that each of these segments of color may be of a different circumferential length than the others. In actual practice, I have obtained best results by using the segments in the following circumferential lengths: dark red 80°, dark blue-violet 80°, orange 30°, blue 30°, red 70°, and green 70°, in all occupying the entire 360° of the screen. But I do not limit myself to any specified lengths of color or to any particular shade or density of color, or to any particular number of colors. I may, for instance, insert a yellow screen between the dark-blue-violet and the orange, thereby adhering more strictly to the full range of color as viewed through a spectroscope; but I find in actual practice, that a better range of color is obtained by the order of colors as hereinbefore stated. When it is desired to accentuate or reduce a particular color in the pictures, the colors of the screen may be arranged so that more or less of that particular color will be projected onto the screen. For the purpose of balancing the various color filters, the combined total of the respective colors must be so graduated in circumferential length, shade or density, as to produce approximately white light when projected rapidly on the viewing screen; i. e., the production of white light by means of colored lights representing component parts of the spectrum, depends upon the correct proportioning of the colored lights. To make this latter more clear and to emphasize the theory of my invention, white light, when resolved by means of a prism, is represented by a series of colors the dominant or most clearly distinct of which are violet, blue, green, yellow, orange and red. Therefore the proportioning of the six colors in the projection screen, must correspond as nearly as possible to the proportioning of the true colors as viewed through a spectroscope, so that when they are added together by means of rapid projection, they will be fused into a pure white light.

It will, of course, be understood that the projection screen $T^2$ may be provided with opaque shutter sections in place of the semi-transparent color filter shutter sections, but I find that in producing motion pictures in colors the color filter shutter sections give better results, owing to the fact that, by these color filter shutter sections, an unbroken band of the dominant colors of the spectrum is actually constantly sustained upon the viewing screen. It will be also understood that the semi-transparent shutter sections may be used in place of the ordinary shutter sections of the rotating screen now commonly used in projection machines, that is to say, in projecting ordinary black and white pictures.

Referring to Fig. 3, "S" illustrates the six dominant or most distinct colors, namely, red, orange, yellow, green, blue and violet, as perceived by the average person in the spectrum, and designated respectively in the drawing by the letters R, O, Y, G, B and V; "$T^3$" illustrates the projection filters, arranged in longitudinal order, in which dark-red, red, orange, dark-blue-violet, blue and green are designated by the letters D—R, R, O, D—B—V, B and G. The two complementary filter sections are designated by the letters "$X^2$" and "$Y^2$".

I have arranged in Fig. 3, the color bands of the projection filter in longitudinal order. It will be noted that the colors in section "$Y^2$" of "$T^3$" are in reverse order to the violet, blue and green colors in "S". This is for the purpose of bringing the dark segment "D—B—V", which corresponds to "V" in "S", in the path of the projection light during the change from the blue-violet or green picture areas to the red or orange picture areas. It will also be noted that the yellow band is eliminated from "$T^3$". I have found that when a yellow band is used, a marked flicker is caused on the viewing screen. This is avoided by eliminating the yellow band.

What I claim is:

1. A movable screen for a motion picture projector formed with two color filter shutter sections of a material permitting the passage of light rays, one of said sections being dark-red in color and the other dark-blue-violet and either section permitting the passage of sufficient selected color rays to slightly illuminate the viewing screen during the period of picture change.

2. A rotatable screen for a motion picture projector formed with two color filter shutter sections of a material permitting the passage of light rays and arranged at diametrically opposite positions, one of said shutter sections being dark-red in color and the other dark-blue-violet and either section permitting the passage of sufficient selected color rays to slightly illuminate the viewing screen during the period of picture change.

3. A movable screen for a motion picture projector formed with exposure sections and shutter sections said sections being formed of a series of color filters gradually increasing in density, the shutter sections having the greatest degree of density and permitting a reduced illumination of the projection viewing screen during the period of change of pictures.

4. A movable screen for a motion picture projector formed with an exposure section composed of orange and red color filters, and a shutter section of a dark-red color filter.

5. A movable screen for a motion picture projector formed with an exposure section composed of orange and red color filters, a shutter section of a dark-red color filter, a second exposure section composed of green and blue color filters, and a second shutter section of a dark-blue-violet color filter, the dark-red shutter section being interposed between the red and the blue color filters and the dark-blue-violet shutter section being interposed between the orange and green color filters.

6. A rotatable screen for a motion picture projector formed with two color filter exposure sections at diametrically opposite positions and two color filter shutter sections at diametrically opposite positions, and interposed between the exposure sections, each of the exposure sections being complementary in color with each of the shutter sections and the said shutter sections possessing the greater opacity by reason of their color.

7. A movable screen for a motion picture projector formed with a plurality of color filter exposure sections and a plurality of color filter shutter sections, the said exposure sections alternating with the shutter sections, the color of each exposure section being complementary with the colors of its adjacent shutter sections and the said shutter sections possessing the greater opacity by reason of their color.

8. A movable screen for a motion picture projector formed with an exposure color filter section and a shutter color filter section, the colors of the two sections together being complementary and the shutter section being of darker color than the exposure section.

9. A movable screen for a motion picture projector formed with a series of color filter sections of different color adapted to be presented successively before the projector by the screen movement, the said sections differing progressively in opacity by reason of their colors and the colors together extending over the entire light-admitting screen area which is to be presented before the projector.

10. A movable screen for a motion picture projector formed with two series of successive color filter sections of different color, the sections of each series differing progressively in opacity by reason of their colors, the combined colors of one series being complementary to the combined colors of the other series and the colors together extending over the entire light-admitting screen area which is to be presented before the projector.

11. A movable screen for a motion picture projector formed with two series of successive color filter sections of different color, the sections of one series being in the sequence of orange, red and dark-red, and the sections of the other series being in the sequence of blue, green and dark-blue violet.

12. A movable screen for a motion picture projector formed with two series of successive color filter sections of different color, the sections of one series being orange, red and dark-red, and the sections of the other series being blue, green and dark-blue-violet respectively.

13. A movable screen for a motion picture projector formed with two series of successive color filter sections of different color, the sections of one series being orange, red and dark-red, and the combined colors of the sections of the other series being complementary to the said colors of the first mentioned series combined.

14. A movable screen for a motion picture projector formed with two series of successive color filter sections of different color, the sections of one series being blue, green, and dark-blue-violet and the combined colors of the sections of the other series being complementary to the said colors of the first mentioned series combined.

In testimony whereof I hereunto affix my signature.

FREDERICK THOMAS O'GRADY.